US012197850B2

(12) United States Patent
Hu

(10) Patent No.: US 12,197,850 B2
(45) Date of Patent: Jan. 14, 2025

(54) METHOD AND APPARATUS FOR PRESENTING POINT CLOUD VIEWPORT, COMPUTER-READABLE MEDIUM, AND ELECTRONIC DEVICE

(71) Applicant: TENCENT TECHNOLOGY (SHENZHEN) COMPANY LIMITED, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 74 days.

(21) Appl. No.: 18/079,229

(22) Filed: Dec. 12, 2022

(65) Prior Publication Data

US 2023/0103794 A1    Apr. 6, 2023

Related U.S. Application Data

(63) Continuation of application No. PCT/CN2021/131349, filed on Nov. 18, 2021.

(30) Foreign Application Priority Data

Dec. 22, 2020  (CN) .......................... 202011528441.0

(51) Int. Cl.
G06F 40/177 (2020.01)
G06F 40/205 (2020.01)
G06T 19/00 (2011.01)

(52) U.S. Cl.
CPC .......... *G06F 40/177* (2020.01); *G06F 40/205* (2020.01); *G06T 19/00* (2013.01)

(58) Field of Classification Search
None
See application file for complete search history.

(56) References Cited

U.S. PATENT DOCUMENTS 10,404,411 B2    9/2019  Chen et al.
10,542,297 B2    1/2020  Chen et al.
(Continued)

FOREIGN PATENT DOCUMENTS

CN    104394478 A    3/2015
CN    106791926 A    5/2017
(Continued)

OTHER PUBLICATIONS

The World Intellectual Property Organization (WIPO) International Search Report for PCT/CN2021/131349 Feb. 15, 2022 8 Pages (including translation).

(Continued)

*Primary Examiner* — Chikaodili E Anyikire
(74) *Attorney, Agent, or Firm* — ANOVALAW GROUP PLLC

(57) ABSTRACT

A method for presenting a point cloud viewport includes: acquiring a point cloud file, the point cloud file including information of a point cloud viewport and auxiliary information associated with the point cloud viewport, the auxiliary information corresponding to a type of the point cloud viewport; parsing the point cloud file to obtain the information of the point cloud viewport and the auxiliary information; and presenting the point cloud viewport according to the information of the point cloud viewport, and presenting corresponding description content in the point cloud viewport according to the auxiliary information.

19 Claims, 5 Drawing Sheets

(56) References Cited

U.S. PATENT DOCUMENTS

| | | | |
|---|---|---|---|
| 10,623,635 | B2 | 4/2020 | Wang et al. |
| 10,742,999 | B2 | 8/2020 | Wang et al. |
| 10,805,620 | B2 | 10/2020 | Wang et al. |
| 10,820,025 | B2 | 10/2020 | Lai et al. |
| 10,924,820 | B2 | 2/2021 | Chen et al. |
| 10,951,874 | B2 | 3/2021 | Chen et al. |
| 11,139,000 | B2 | 12/2021 | Wang et al. |
| 11,197,040 | B2 | 12/2021 | Wang et al. |
| 11,200,700 | B2 * | 12/2021 | Wang .................. G06T 9/00 |
| 2018/0041820 | A1 | 2/2018 | Xu et al. |
| 2018/0075576 | A1 | 3/2018 | Liu et al. |
| 2021/0360219 | A1 * | 11/2021 | Wang .................. H04N 13/111 |
| 2023/0281882 | A1 * | 9/2023 | Nishi .................. H04N 19/70 |
| | | | 382/240 |

FOREIGN PATENT DOCUMENTS

| | | |
|---|---|---|
| CN | 106844610 A | 6/2017 |
| CN | 112017300 A | 12/2020 |
| CN | 112037314 A | 12/2020 |

OTHER PUBLICATIONS

Shuai Zhao et al., "Study of User QoE Improvement for Dynamic Adaptive Streaming Over HTTP (MPEG-DASH)" ,2017, pp. 566-570. International Conference on Networking and Communications (ICNC).

Xiang Zhang et al., "Linear Model based Geometry Coding for Lidar Acquired Point Clouds", 2020, pp. 406-406. 2020 Data Compression Conference (DCC), Snowbird, UT, USA.

Min Zhang et al., "PointHop: An Explainable Machine Learning Method for Point Cloud Classification", 2000, IEEE TMM.

Li Li et al., "Occupancy-Map-Based Rate Distortion Optimization for Video-Based Point Cloud Compression", 2019, ICIP.

Li Li et al., "Occupancy-map-based Rate Distortion Optimization and Partition for Video-based Point Cloud Compression ", 2020, IEEE TCSVT.

Li Li et al., "Video-based compression for plenoptic point clouds", arXiv:1911.01355.

Li Li et al ., "$\lambda$-domain Perceptual Rate Control for 360-degree Video Compression", 2020, IEEE Journal on Selected Topics in Signal Processing.

Li Li et al ., "Rate Control for Video-based Point Cloud Compression", 2020, IEEE TIP.

Li Li et al., "Efficient Projected Frame Padding for Video-based Point Cloud Compression", 2019, IEEE TMM.

Min Zhang et al., "Unsupervised Feedforward Feature (UFF) Learning for Point Cloud Classification and Segmentation", Dec. 1-4, 2020, 2020 IEEE International Conference on Visual Communications and Image Processing (VCIP), Macau.

Pranav Kadam et al., "Unsupervised Point Cloud Registration Via Salient Points Analysis (SPA)", Dec. 1-4, 2020, 2020 IEEE International Conference on Visual Communications and Image Processing (VCIP), Macau.

Sejin Oh et al., "Draft text of ISO/IEC FDIS 23090-18 Carriage of Geometry-based Point Cloud Compression Data", ISO/IEC JTC 1/SC 29/WG 03 N0311.

"Information technology—Coding of audio-visual objects—Part 12: ISO base media file format", Sep. 2022, ISO/IEC JTC 1/SC 29/WG 11.

* cited by examiner

METHOD AND APPARATUS FOR PRESENTING POINT CLOUD VIEWPORT, COMPUTER-READABLE MEDIUM, AND ELECTRONIC DEVICE

RELATED APPLICATION(S)

This application is a continuation application of PCT Patent Application No. PCT/CN2021/131349 filed on Nov. 18, 2021, which claims priority to Chinese Patent Application No. 2020115284410, entitled "METHOD AND APPARATUS FOR PRESENTING POINT CLOUD VIEWPORT, COMPUTER-READABLE MEDIUM, AND ELECTRONIC DEVICE" and filed with the China National Intellectual Property Administration on Dec. 22, 2020, all of which are incorporated herein by reference in entirety.

FIELD OF THE TECHNOLOGY

The present disclosure relates to the technical field of computers and communication, and in particular, to a method for presenting a point cloud viewport.

BACKGROUND

For point cloud media, certain existing technology involves the spatial position information of a point cloud viewport, which can meet the desirables for rendering an area of the point cloud viewport; however, for the rich implementation scenarios of point cloud media, it may become difficult to realize diverse point cloud presentation forms, and certain business desirables may not be met.

SUMMARY

Embodiments of the present disclosure provide a method and apparatus for presenting a point cloud viewport, a computer-readable medium, and an electronic device, which can provide more diverse presentation forms during presentation of a point cloud viewport and meet the business desirables of different implementation scenarios.

In one aspect, the present disclosure provide a method for presenting a point cloud viewport, which is implemented by an electronic device and includes: acquiring a point cloud file, the point cloud file including information of a point cloud viewport and auxiliary information associated with the point cloud viewport, the auxiliary information corresponding to a type of the point cloud viewport; parsing the point cloud file to obtain the information of the point cloud viewport and the auxiliary information; and presenting the point cloud viewport according to the information of the point cloud viewport, and presenting corresponding description content in the point cloud viewport according to the auxiliary information.

In another aspect, the present disclosure provides an apparatus for presenting a point cloud viewport, the apparatus including: a memory storing computer program instructions; and a processor coupled to the memory and configured to execute the computer program instructions and perform: acquiring a point cloud file, the point cloud file including information of a point cloud viewport and auxiliary information associated with the point cloud viewport, the auxiliary information corresponding to a type of the point cloud viewport; parsing the point cloud file to obtain the information of the point cloud viewport and the auxiliary information; and presenting the point cloud viewport according to the information of the point cloud viewport, and presenting corresponding description content in the point cloud viewport according to the auxiliary information.

In another aspect, the present disclosure provides non-transitory computer-readable storage medium storing computer program instructions executable by at least one processor to perform: acquiring a point cloud file, the point cloud file including information of a point cloud viewport and auxiliary information associated with the point cloud viewport, the auxiliary information corresponding to a type of the point cloud viewport; parsing the point cloud file to obtain the information of the point cloud viewport and the auxiliary information; and presenting the point cloud viewport according to the information of the point cloud viewport, and presenting corresponding description content in the point cloud viewport according to the auxiliary information.

According to the technical solutions of the embodiments of the present disclosure, a point cloud file includes information of a point cloud viewport and auxiliary information associated with the point cloud viewport, the auxiliary information corresponds to a type of the point cloud viewport. The point cloud file is parsed to obtain the information of the point cloud viewport and the auxiliary information, the point cloud viewport can be presented according to the information of the point cloud viewport, and corresponding description content can be presented in the point cloud viewport according to the auxiliary information, so that presentation of corresponding description content according to different types of point cloud viewports can be realized. In practice, a type of a point cloud viewport corresponds to an implementation scenario of point cloud media. Therefore, the technical solutions of the embodiments of the present disclosure can not only provide more diverse presentation forms during presentation of a point cloud viewport, but also meet the business desirables of different implementation scenarios.

It is to be understood that the general descriptions and the following detailed descriptions are merely for illustration and explanation purposes and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
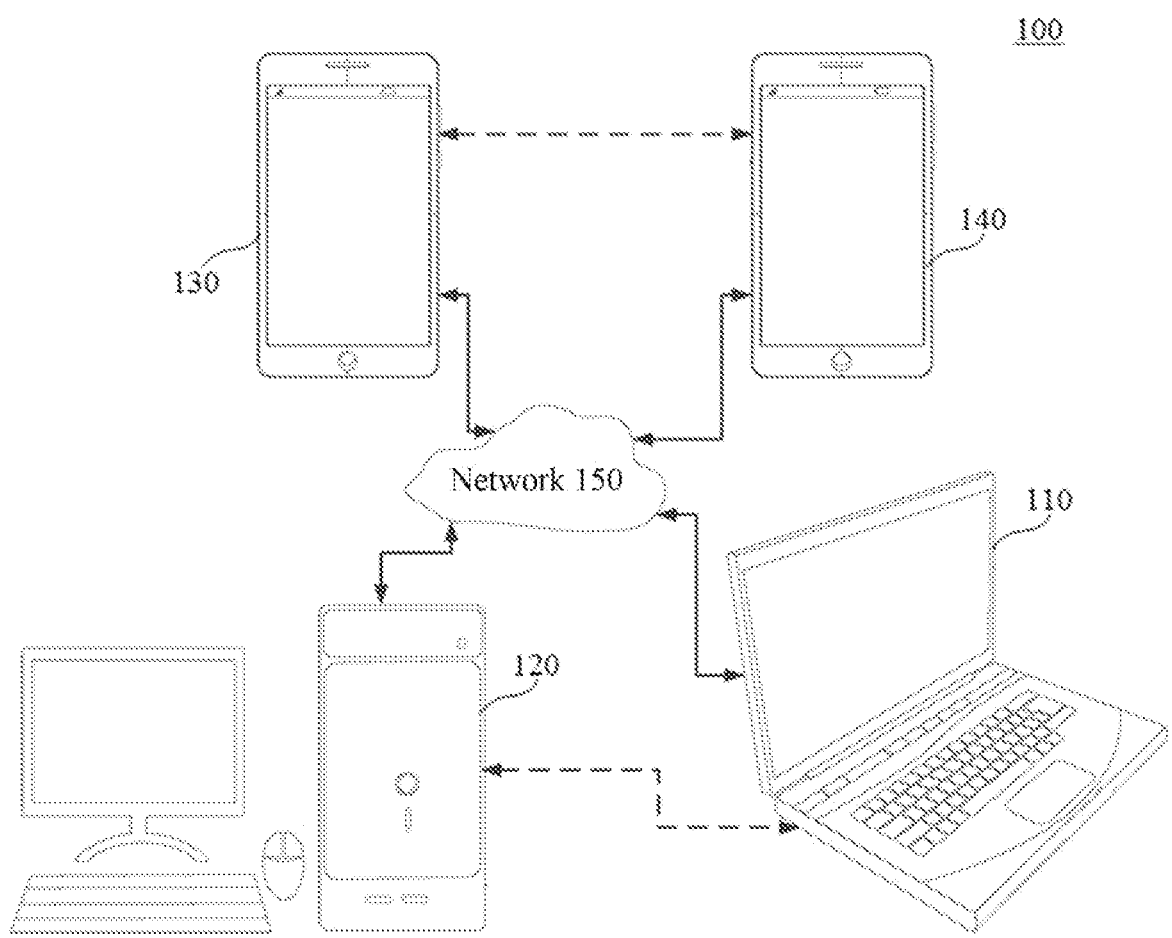
FIG. 1 is a schematic diagram of an exemplary system architecture.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In addition, the described features, structures, or characteristics may be combined in one or more embodiments in any appropriate manner. In the following descriptions, a lot of specific details are provided to give a comprehensive understanding of the embodiments of the present disclosure. However, a person skilled in the art is to be aware that, the technical solutions in the present disclosure may be implemented without one or more of the particular details, or another method, unit, apparatus, or step may be used. In other implementations, well-known methods, apparatuses, implementations, or operations are not shown or described in detail, to avoid obscuring the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not have to include all content and operations/steps, and do not have to be performed in the described orders either. For example, some operations/steps may be further divided, while some operations/steps may be combined or partially combined. Therefore, an actual execution order may change according to an implementation.

"Plurality of" mentioned in the present disclosure means two or more. The term "and/or" used in present disclosure describes an association relationship for describing associated objects and represents that three relationships may exist. For example, A and/or B may represent the following three scenarios: Only A exists, both A and B exist, and only B exists. The character "/" generally indicates an "or" relationship between the associated objects.

FIG. 1 is a schematic diagram of an exemplary system architecture to which a technical solution according to an embodiment of the present disclosure is applicable.

As shown in FIG. 1, the system architecture 100 includes multiple terminal apparatuses, which can communicate with each other through, for example, a network 150. For example, the system architecture 100 may include a first terminal apparatus 110 and a second terminal apparatus 120 that are connected to each other through the network 150. In the architecture shown in FIG. 1, the first terminal apparatus 110 and the second terminal apparatus 120 can implement unidirectional data transmission.

For example, the first terminal apparatus 110 can encode point cloud video data (e.g. a point cloud video stream acquired by the terminal apparatus 110) and transmit the encoded point cloud video data to the second terminal apparatus 120 through the network 150. The encoded point cloud video data is transmitted in the form of one or more encoded video bitstreams. The second terminal apparatus 120 can receive the encoded point cloud video data through the network 150, decode the encoded point cloud video data to restore the point cloud video data, and display video images according to the restored point cloud video data.

In an embodiment of the present disclosure, the system architecture 100 may include a third terminal apparatus 130 and a fourth terminal apparatus 140 that can implement bidirectional transmission of encoded point cloud video data, and the bidirectional transmission may be implemented during, for example, video communication. During bidirectional transmission of data, one of the third terminal apparatus 130 and the fourth terminal apparatus 140 can encode point cloud video data (e.g. a point cloud video image stream acquired by the terminal apparatus) and transmit the encoded point cloud video data to the other one of the third terminal apparatus 130 and the fourth terminal apparatus 140 through the network 150. One of the third terminal apparatus 130 and the fourth terminal apparatus 140 can also receive the encoded point cloud video data transmitted by the other one of the third terminal apparatus 130 and the fourth terminal apparatus 140, decode the encoded point cloud video data to restore the point cloud video data, and display point cloud video images on an accessible display apparatus according to the restored point cloud video data.

In the system architecture in FIG. 1, the first terminal apparatus 110, the second terminal apparatus 120, the third terminal apparatus 130, and the fourth terminal apparatus 140 may be servers, personal computers or smart phones, but executive bodies to which the solutions disclosed in the present disclosure are applicable are not limited thereto. The embodiments disclosed in the present disclosure are also applicable to laptop computers, tablet computers, media players and/or dedicated video conference devices. The network 150 represents any number of networks configured to transmit encoded point cloud video data between the first terminal apparatus 110, the second terminal apparatus 120, the third terminal apparatus 130, and the fourth terminal apparatus 140, which include, for example, wired and/or wireless communication networks. The communication network 150 can exchange data in circuit-switched and/or packet-switched channels. The network may include a telecommunication network, a local area network, a wide area network and/or the Internet. For purposes of the present disclosure, unless explained below, the architecture and topology of the network 150 is immaterial to the operation disclosed in the present disclosure.

Figure 2:
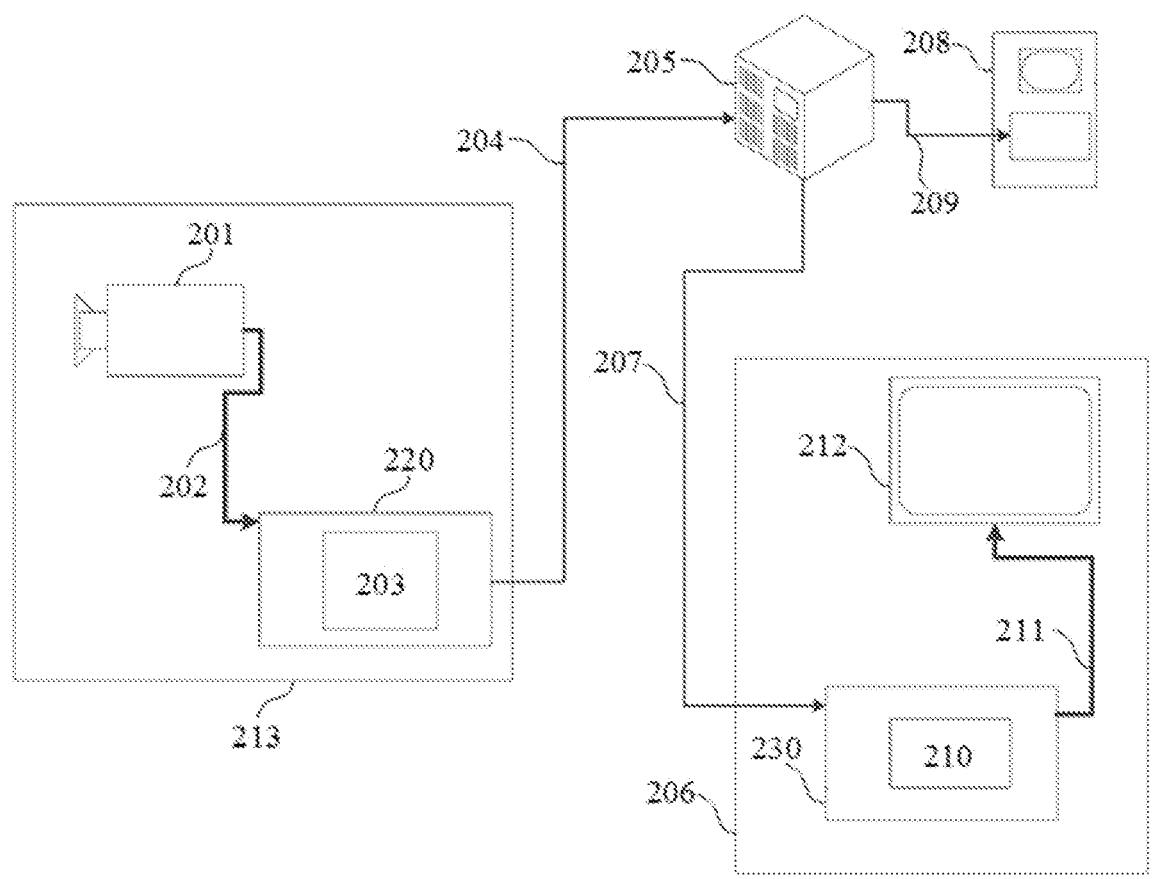
FIG. 2 is a schematic diagram of a placement mode of a video encoder and a video decoder in a streaming transmission system.

In an embodiment of the present disclosure, FIG. 2 shows a replacement mode of a video encoder and a video decoder in a streaming transmission environment. The subject disclosed in the present disclosure is equally applicable to other applications supporting video, which include, for example, videoconferencing, digital television (TV), and compressed video stored in digital media including CDs, DVDs, memory sticks, etc.

The streaming transmission system may include an acquisition sub-system 213, and the acquisition sub-system 213 may include a video source 201 including a digital camera and a point cloud media generation device, and uncompressed video picture streams 202 created by the video source. In an embodiment, the video image streams 202 include samples captured by a digital camera, or samples captured or generated by point cloud media. Compared to encoded video data 204 (or encoded video bitstreams 204), the uncompressed video image streams 202 are depicted as thick lines to emphasize the video image streams with large data volume. The video image streams 202 can be processed by an electronic apparatus 220 including a video encoder 203 coupled to the video source 201. The video encoder 203 may be hardware, software or a combination of hardware and software, and is configured to realize or implement various aspects of the disclosed subject that will be described in detail below. Compared to the video image streams 202, the encoded video data 204 (or the encoded video bitstreams 204) are depicted as fine lines to emphasize the encoded video data 204 (or the encoded video bitstreams 204) with relatively small data volume. The encoded video data can be stored in a streaming transmission server 205 for future use. One or more streaming transmission client sub-systems, such as a client sub-system 206 and a client sub-system 208 in FIG. 2, can access the streaming transmission server 205 to retrieve a copy 207 and a copy 209 of the encoded video data 204. The client sub-system 206 may include, for example, the video decoder 210 in the electronic apparatus 230. The video decoder 210 decodes the inputted copy 207 of the encoded video data, and generates outputted video images streams 211 that can be displayed on a display 212 (e.g. a display screen) or other presentation apparatuses. In some streaming transmission systems, the encoded video data 204, video data 207, and video data 209 (e.g. video bitstreams) can be encoded according to certain video encoding/compression standards. Examples of these standards include ITU-T H.265.

The electronic apparatus 220 and the electronic apparatus 230 may include other components not shown in the figures. For example, the electronic apparatus 220 may include a video file decoder, and the electronic apparatus 230 may also include a video file encoder.

In an embodiment of the present disclosure, the video data in the above embodiments may be point cloud media data. A point cloud is a set of discrete points that are randomly distributed in space and express the spatial structure and surface attributes of a three-dimensional (3D) object or scene. Each point in the point cloud at least has 3D position information, and may have color, material or other information in different implementation scenarios. Usually, each point in the point cloud has the same number of additional attributes. According to the encoding scheme, point cloud media can also be divided into point cloud media compressed by video-based point cloud compression (VPCC) and point cloud media compressed by geometry-based point cloud compression (GPCC). In a file encapsulation of point cloud media, 3D position information is usually referred to as a geometry component of a point cloud file, and attribute information is referred to as an attribute component of the point cloud file. A point cloud file usually has only one geometry component but can have one or more attribute components.

A point cloud can express the spatial structure and surface attributes of a 3D object or scene flexibly and conveniently, so it is widely used. Main implementation scenarios of point clouds can be classified into two categories: machine perception point clouds and human perception point clouds. Machine perception point clouds include, for example, an autonomous navigation system, a real-time inspection system, a geographic information system, a visual sorting robot, and a disaster releasing robot. Human perception point clouds include, for example, a digital cultural heritage, a free view broadcast, a 3D immersion communication, and a 3D immersion interaction.

Methods for acquiring point clouds include: generation with a computer, 3D laser scanning, and 3D photogrammetry. Point clouds of 3D objects and scenes can be generated by a computer. Point clouds of static real-world 3D objects or scenes can be obtained by 3D scanning, and millions of point clouds can be obtained every second. Point clouds of dynamic real-world 3D objects or scenes can be obtained by 3D photogrammetry, and tens of millions of point clouds can be obtained every second. In addition, in the medical field, point clouds of biological tissues and organs can be obtained by magnetic resonance imaging (MM), computed tomography (CT) or electromagnetic positioning information. These technologies reduce the acquisition costs and time period of point cloud data and improve the precision of data. The change in the acquisition method of point cloud data makes it possible to acquire a large volume of point cloud data. With the continuous accumulation of a large volume of point cloud data, efficient storage, transmission, publication, sharing, and standardization of point cloud data have become the key to the implementation of point clouds.

After point cloud media are encoded, it is desirable to encapsulate the encoded data streams and transmit the encapsulated encoded data streams to a client. Correspondingly, a point cloud media player decapsulates the acquired point cloud file, decode the encoded data streams, and present the decoded data streams.

In an embodiment of the present disclosure, point cloud media compressed by VPCC are taken as an example, and the meaning of each field contained in a point cloud file is as follows:

viewport_type: it indicates a type of a point cloud viewport, and the meaning of each value is shown in Table 1:

TABLE 1

| Value | Description |
| --- | --- |
| 0 | A recommended viewport obtained according to shooting intentions of a content creator |
| 1 | A recommended viewport obtained according to viewing statistics of users |
| 2 | A recommended viewport created by another user |
| 3 | A recommended initial viewport |
| 4-239 | Reserved fields |
| 240-255 | Undefined fields (can be self-defined by an application or other standards) | num_viewports: it indicates the number of point cloud viewports.

viewport_description: it indicates description information of a point cloud viewport, and is a null-terminated string.

int_camera_flag and camera_intrinsic_flag: it indicates whether a point cloud viewport contains intrinsic parameters of a camera.

ext_camera_flag or camera_extrinsic_flag: it indicates whether a point cloud viewport contains extrinsic parameters of a camera.

IntCameraInfoStruct: it is used for indicating intrinsic parameters of a camera, which include a camera ID, a camera mapping type, camera mapping-related parameters, the depth of a near plane and a far plane that form a viewport, etc.

ExtCameraInfoStruct: it is used for indicating extrinsic parameters of a camera, which includes a viewport ID, a viewport position, a rotation angle, etc.

The technical solutions of the above embodiments indicate spatial position information of a point cloud viewport, which meets the desirables for rendering an area of the point cloud viewport. However, in view of the rich implementation scenarios of point clouds, such as a high-precision map and a video communication, certain auxiliary information is attached in an area of a point cloud viewport to support more diverse presentation forms. Therefore, for the rendering and presentation of point cloud media, the technical solutions of the embodiments of the present disclosure provide a solution for indicating auxiliary information in an area of a point cloud viewport, which will be described in detail below.

Figure 3:
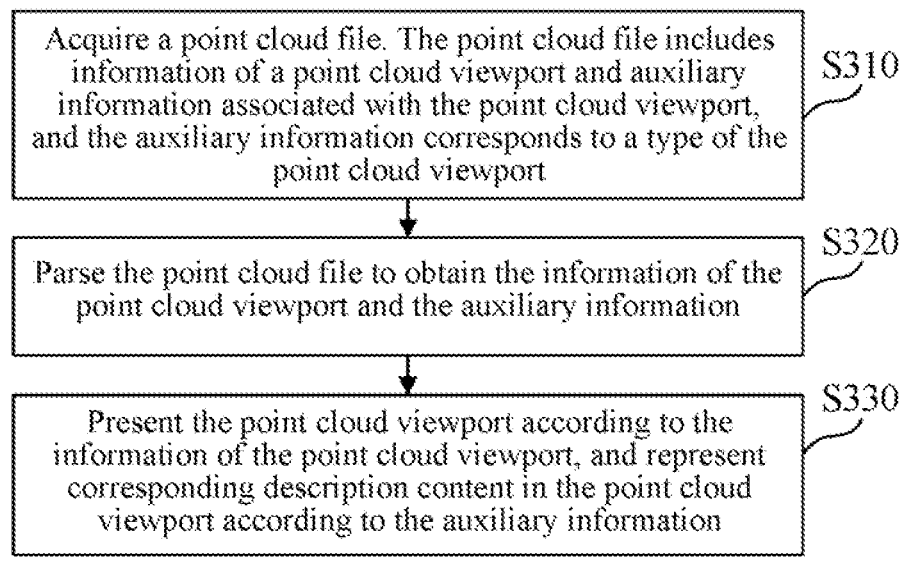
FIG. 3 is a schematic flowchart of a method for presenting a point cloud viewport according to certain embodiment(s) of the present disclosure.

FIG. 3 shows a flowchart of a method for presenting a point cloud viewport according to an embodiment of the present disclosure. The method for presenting a point cloud viewport can be implemented by an electronic device for playing point cloud media, and the electronic device may be a smart phone or tablet computer. Referring to FIG. 3, the method for presenting a point cloud viewport at least includes step S310 to step S330, which will be described in detail below.

Step S310. Acquire a point cloud file. The point cloud file includes information of a point cloud viewport and auxiliary information associated with the point cloud viewport, and the auxiliary information corresponds to a type of the point cloud viewport.

In an embodiment of the present disclosure, the point cloud file may be generated by a computer, or obtained by 3D laser scanning, or obtained by 3D photogrammetry. The way to acquire a point cloud file may be to receive a point cloud file transmitted by a transmitter (e.g. a server). The transmitter can add corresponding auxiliary information based on a type of a point cloud viewport and perform encapsulation to obtain a point cloud file.

In certain embodiment(s), a type of a point cloud viewport corresponds to a type of a point cloud file. For example, a type of a point cloud file may be a film, a high-precision map or a video communication, and a type of a point cloud viewport is a point cloud viewport corresponding to the film, the high-precision map or the video communication.

In addition, a point cloud file can include one or more point cloud viewport, and a point cloud viewport can also be associated with one or more auxiliary information.

In an embodiment of the present disclosure, the point cloud file may include a first field, and a value of the first field is used for indicating the number of the auxiliary information associated with the point cloud viewport. In certain embodiment(s), the first field may be, for example, num_associated_info, which is used for representing the number of the auxiliary information associated with the point cloud viewport In an embodiment of the present disclosure, the auxiliary information may include a second field, which is used for indicating a type of the auxiliary information associated with the point cloud viewport. Different values of the second field correspond to different types of auxiliary information. In certain embodiment(s), the second field may be, for example, associated_info_type.

In an embodiment of the present disclosure, it indicates that the auxiliary information associated with the point cloud viewport is a subtitle type when or in response to determining that a value of the second field is a first value; it indicates that the auxiliary information associated with the point cloud viewport is a marker type when or in response to determining that a value of the second field is the second value; and it indicates that the auxiliary information associated with the point cloud viewport is an annotation type when or in response to determining that a value of the second field is a third value. In certain embodiment(s), the first value may be, for example, 0, the second value may be, for example, 1, and the third value may be, for example, 2. In certain embodiment(s), the second field may be other values, such as a value from 3 to 255, which are used for representing types of auxiliary information.

In an embodiment of the present disclosure, the auxiliary information may include a third field, which is used for indicating an identifier of the auxiliary information. The identifier is used for uniquely identifying the auxiliary information. In certain embodiment(s), the third field may be, for example, associated_info_id.

In an embodiment of the present disclosure, the auxiliary information may include a fourth field, which is used for indicating description content of the auxiliary information. In certain embodiment(s), the fourth field may be, for example, associated_info_description, which may be a null-terminated string and is used for indicating description content of the auxiliary information, and the description content is used for presenting content in a point cloud viewport.

In an embodiment of the present disclosure, the auxiliary information may include a fifth field, which is used for indicating an area, associated with the auxiliary information, of the point cloud viewport. It indicates that the auxiliary information is associated with the whole area of the point cloud viewport when or in response to determining that a value of the fifth field is a first value; and it indicates that the auxiliary information is associated with a partial area of the point cloud viewport when or in response to determining that a value of the fifth field is a second value. In certain embodiment(s), the fifth field may be, for example, vp_relative_pos_flag, the first value may be, for example, 0, and the second value may be, for example, 1. The specific values are only exemplary.

In an embodiment of the present disclosure, the auxiliary information may include a sixth field, which is used for indicating a distance between a planar area associated with the auxiliary information and the central position in the point cloud viewport. The planar area is used for displaying description content of the auxiliary information. In certain embodiment(s), the sixth field may be, for example, clipping_associated_plane. Attribute information of the planar area is matched with attribute information of the point cloud viewport, and the attribute information may include, for example, at least one of position information, rotation information, and plane type information.

In an embodiment of the present disclosure, the point cloud file may include a seventh field, which is used for indicating the number of point cloud viewports associated with auxiliary information. In certain embodiment(s), the seventh field may be, for example, num_associated_viewports.

In an embodiment of the present disclosure, the point cloud file may include an eighth field, which is used for indicating an identifier of the point cloud viewport associated with the auxiliary information. The identifier is used for uniquely identifying the point cloud viewport. In certain embodiment(s), the eighth field may be, for example, viewpor_id.

It should be noted that, the point cloud file may include one or more of the first field to the eighth field described above.

Step S320. Parse the point cloud file to obtain the information of the point cloud viewport and the auxiliary information.

In an embodiment of the present disclosure, the information of the point cloud viewport may be, for example, the information that is indicated by the fields and related to the point cloud viewport in the above embodiments, and may be, for example, information indicated by one or more of the following fields: viewport_type, num_viewports, viewport_description, int_camera_flag, camera_intrinsic_flag, ext_camera_flag, camera_extrinsic_flag, IntCameraInfoStruct, and ExtCameraInfoStruct.

In an embodiment of the present disclosure, the auxiliary information may be, for example, the information indicated by one or more of the first field to the eighth field in the above embodiments.

Step S330. Present the point cloud viewport according to the information of the point cloud viewport, and present corresponding description content in the point cloud viewport according to the auxiliary information.

In an embodiment of the present disclosure, the operation of presenting the point cloud viewport according to the information of the point cloud viewport may be that: a corresponding type of the point cloud viewport is presented according to a type of the point cloud viewport indicated by viewport_type; a corresponding number of point cloud viewports is presented according to the number of point cloud viewports indicated by num_viewports; and corresponding information is displayed according to description information of the point cloud viewport indicated by viewport_description. In addition, whether the point cloud viewport includes intrinsic parameters of a camera can be determined according to int_camera_flag and/or camera_intrinsic_flag; whether the point cloud viewport includes extrinsic parameters of a camera can be determined according to ext_camera_flag and/or camera_extrinsic_flag; intrinsic parameters of a camera that are included in the point cloud viewport are determined according to IntCameraInfoStruct; and extrinsic parameters of a camera that are included in the point cloud viewport are determined according to ExtCameraInfoStruct. Corresponding information is presented according to the intrinsic parameters and/or extrinsic parameters of the camera.

In an embodiment of the present disclosure, the operation of presenting corresponding description content in the point cloud viewport according to the auxiliary information includes: description content to be displayed in the point cloud viewport is acquired according to values of the fields included in the auxiliary information, a presentation position of the description content is determined, and the description content is displayed at the presentation position in the point cloud viewport. For example, description content to be displayed in the point cloud viewport can be determined according to a value of the fourth field, and a presentation position of the description content is determined according to a value of the sixth field.

In certain embodiment(s), the number of the auxiliary information can also be determined according to a value of the first field, and a corresponding number of auxiliary information is displayed in the point cloud viewport based on the number of auxiliary information. A type of the auxiliary information is determined according to a value of the second field, and corresponding auxiliary content is displayed in the point cloud viewport according to the type of the auxiliary information. An identifier of the auxiliary information is determined according to the third field. An area, associated with the auxiliary information, of the point cloud viewport is determined according to the fifth field, and description content is displayed in the associated area. Meanwhile, the number of point cloud viewports associated with auxiliary information can also be determined according to the seventh field. An identifier of the point cloud viewport associated with the auxiliary information is determined according to the eighth field.

Figure 4:
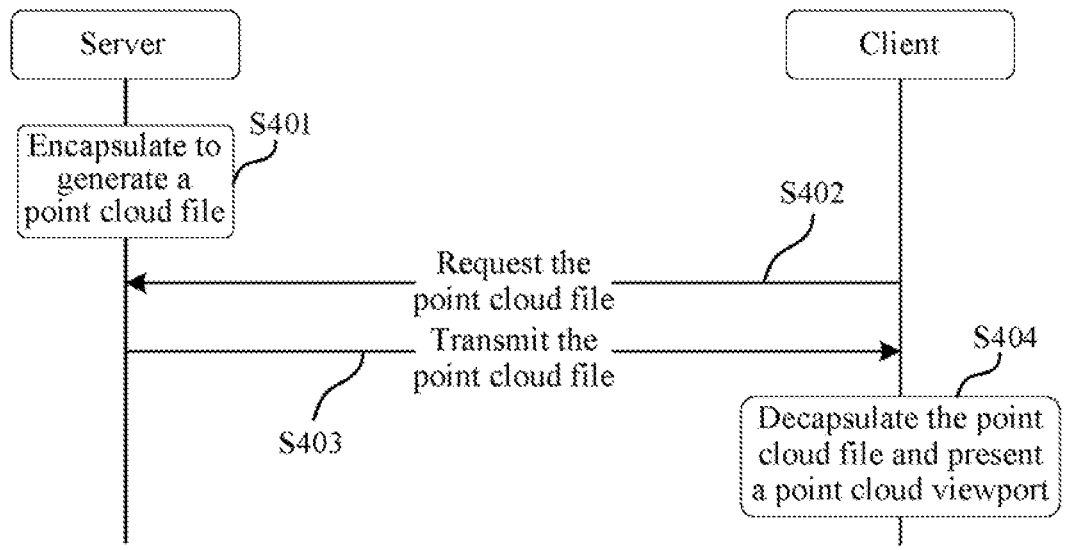
FIG. 4 is a schematic flowchart of a method for presenting a point cloud viewport according to certain embodiment(s) of the present disclosure.

In certain embodiment(s), as shown in FIG. 4, a method for presenting a point cloud file is described, where a server generates a point cloud file and a client consumes the point cloud file, as an example, which includes the following steps:

Step S401. A server performs encapsulation to generate a point cloud file.

In an embodiment of the present disclosure, the server can locally generate corresponding auxiliary information for a corresponding type of a point cloud viewport according to an implementation scenario (e.g. a film scenario, a high-precision map scenario, and a video communication scenario) of a point cloud, and perform encapsulation to generate a point cloud file.

Step S402. A client requests for the point cloud file from the server.

Step S403. The server transmits the point cloud file to the client.

Step S404. The client decapsulates the point cloud file and presents a point cloud viewport.

In an embodiment of the present disclosure, the client can decapsulate the point cloud file to obtain auxiliary information of different point cloud viewports after receiving the point cloud file, and provide corresponding presentation content according to corresponding auxiliary information during presentation of a corresponding point cloud viewport.

In order to implement the technical solutions of the embodiment shown in FIG. 4, information of some fields is added in the embodiments of the present disclosure. Auxiliary information in an area of a point cloud viewport is defined below by taking extension of an ISOBMFF data box as an example. The auxiliary information is not only applicable to the VPCC encapsulation technology, but also applicable to the GPCC encapsulation technology. Extended fields are as follows:

num_associated_info: it indicates the number of auxiliary information associated with a current viewport (point cloud viewport).

associated_info_type: it indicates a type of the associated auxiliary information, and its values are shown in Table 2 below:

TABLE 2

| Value | Description |
| --- | --- |
| 0 | Subtitle |
| 1 | Marker |
| 2 | Annotation |
| 3-255 | Information self-defined by an application or other standards | associated_info_id: it indicates an identifier of current auxiliary information.

associated_info_description: it indicates description content of auxiliary information, and is a null-terminated string.

vp_relative_pos_flag: it indicates an area, associated with the current auxiliary information, of the viewport. It indicates that the current auxiliary information is associated with the whole area of the point cloud viewport when or in response to determining that a value of vp_relative_pos_flag is 0; and it indicates that the current auxiliary information is associated with a certain planar area of the point cloud viewport when or in response to determining that a value of vp_relative_pos_flag is 1.

clipping_associated_plane: it indicates a distance between a planar area associated with the auxiliary information and the central position in the point cloud viewport. Position information, rotation information, plane type information, etc. of the planar area are the same as corresponding information of the point cloud viewport.

um_associated_viewports: it indicates the number of viewports associated with auxiliary information.

viewpor_id: it indicates an identifier of the viewport including the auxiliary information.

In certain embodiment(s) of the present disclosure, for example, three point cloud files F1 to F3 are stored in the server, and respectively correspond to a film, a high-precision map, and a video communication. Auxiliary information respectively encapsulated by the server is as follows:

Point cloud file F1: subtitle information changes with time, so auxiliary information of the point cloud file F1 can be given in ViewportAssociatedInfoSample.

Examples of parameters in ViewportAssociatedInfoSample are as follows: {num_associated_viewports=1; viewpor_id=001; num_associated_info=1; associated_info_type=0; associated_info_id=001; associated_info_description=""; vp_relative_pos_flag=1, clipping_associated_plane=2.0}

Point cloud file F2: auxiliary information of a high-precision map also changes with time, so auxiliary information of the point cloud file F2 can also be given in ViewportAssociatedInfoSample.

Examples of parameters in ViewportAssociatedInfoSample are as follows: {num_associated_viewports=1; viewpor_id=001; num_associated_info=1; associated_info_type=1; associated_info_id=001; associated_info_description="traffic jam"; vp_relative_pos_flag=0}

Point cloud file F3: auxiliary information of a video communication does not change with time, so auxiliary information of the point cloud file F3 can be given in ViewportAssociatedInfoSampleEntry, which is as follows:

{num_associated_viewports=1; viewpor_id=001; num_associated_info=1; associated_info_type=2; associated_info_id=001; associated_info_description="userId:01"; vp_relative_pos_flag=1, clipping_associated_plane=2.0}

For the point cloud file F1, the point cloud file F2, and the point cloud file F3, a client U1, a client U2, and a client U3 respectively request for the point cloud files F1 to F3 from the server, and the server transmits the point cloud files to the corresponding clients. The client decapsulates the point cloud file to obtain auxiliary information of different point cloud viewports after receiving the point cloud file, and provides corresponding presentation content according to auxiliary information during presentation of a corresponding point cloud viewport.

In certain embodiment(s), after receiving the point cloud file F1, the client U1 correspondingly searches for corresponding subtitle information in a subtitle track according to associated_info_id in auxiliary information of a point cloud viewport during viewing of the corresponding point cloud viewport, and renders and presents the subtitle information at a corresponding position in a viewport space according to information of clipping_associated_plane.

After receiving the point cloud file F2, during use of the high-precision map, the client U2 can know that a current viewport area (i.e. a certain road section in the high-precision map) is marked as traffic congestion according to information of associated_info_description and a flag of vp_relative_pos_flag during parsing of a corresponding viewport, display traffic congestion information in the current point cloud viewport, and provide the traffic congestion information as input information for an autonomous driving system to make a decision.

After receiving the point cloud file F3, the client U3 parses auxiliary information to know that a certain fixed viewport area of a current video communication includes corresponding annotation information. The client U3 parses the annotation information to obtain a user ID, and presents personal profile information of a related user in a corresponding area according to information of clipping_associated_plane.

The technical solutions of the above embodiments of the present disclosure can add specific auxiliary information according to different implementation scenarios during rendering and presentation of point cloud media, and associate the auxiliary information with a viewport area, and a user acquires the auxiliary information during consumption of the specific viewport area, so that more diverse implementation forms are provided during presentation and consumption of point clouds.

The following describes apparatus embodiments of the present disclosure, and the apparatus embodiments may be used for performing the method for presenting a point cloud viewport in the embodiment of the present disclosure. For details not disclosed in the apparatus embodiments of the present disclosure, reference may be made to the embodiments of the method for presenting a point cloud viewport of the present disclosure.

Figure 5:
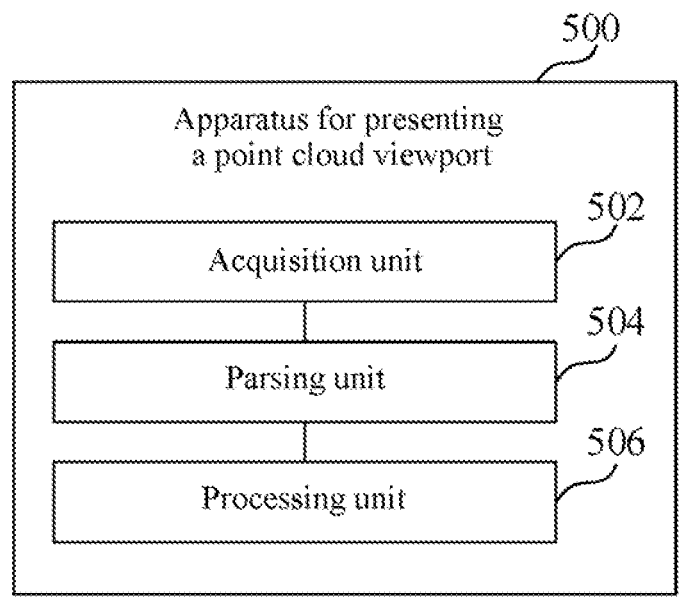
FIG. 5 is a schematic block diagram of an apparatus for presenting a point cloud viewport according to certain embodiment(s) of the present disclosure.

FIG. 5 shows a block diagram of an apparatus for presenting a point cloud viewport according to an embodiment of the present disclosure. The apparatus for presenting a point cloud viewport can be arranged in a point cloud media player, and the player may be a smart phone or tablet computer.

As shown in FIG. 5, an apparatus 500 for presenting a point cloud viewport according to an embodiment of the present disclosure includes: an acquisition unit 502, a parsing unit 504, and a processing unit 506.

The acquisition unit 502 is configured to acquire a point cloud file, the point cloud file including information of a point cloud viewport and auxiliary information associated with the point cloud viewport, the auxiliary information corresponding to a type of the point cloud viewport; the parsing unit 504 is configured to parse the point cloud file to obtain the information of the point cloud viewport and the auxiliary information; and the processing unit 506 is configured to present the point cloud viewport according to the information of the point cloud viewport, and present corresponding description content in the point cloud viewport according to the auxiliary information.

In some embodiments of the present disclosure, based on the above solutions, the point cloud file includes a first field, and a value of the first field is used for indicating the number of the auxiliary information associated with the point cloud viewport.

In some embodiments of the present disclosure, based on the above solutions, the auxiliary information includes a second field, which is used for indicating a type of the auxiliary information associated with the point cloud viewport. Different values of the second field correspond to different types of auxiliary information.

In some embodiments of the present disclosure, based on the above solutions, it indicates that the auxiliary information associated with the point cloud viewport is a subtitle type when or in response to determining that a value of the second field is a first value; it indicates that the auxiliary information associated with the point cloud viewport is a marker type when or in response to determining that a value of the second field is the second value; and it indicates that the auxiliary information associated with the point cloud viewport is an annotation type when or in response to determining that a value of the second field is the third value.

In some embodiments of the present disclosure, based on the above solutions, the auxiliary information includes a third field, which is used for indicating an identifier of the auxiliary information. The identifier is used for uniquely identifying the auxiliary information.

In some embodiments of the present disclosure, based on the above solutions, the auxiliary information includes a fourth field, which is used for indicating description content of the auxiliary information.

In some embodiments of the present disclosure, based on the above solutions, the auxiliary information includes a fifth field, which is used for indicating an area, associated with the auxiliary information, of the point cloud viewport.

It indicates that the auxiliary information is associated with the whole area of the point cloud viewport when or in response to determining that a value of the fifth field is a first value; and it indicates that the auxiliary information is associated with a partial area of the point cloud viewport when or in response to determining that a value of the fifth field is a second value.

In some embodiments of the present disclosure, based on the above solutions, the auxiliary information includes a sixth field, which is used for indicating a distance between a planar area associated with the auxiliary information and the central position in the point cloud viewport. The planar area is used for displaying description content of the auxiliary information.

In some embodiments of the present disclosure, based on the above solutions, attribute information of the planar area is matched with attribute information of the point cloud viewport, and the attribute information includes at least one of position information, rotation information, and plane type information.

In some embodiments of the present disclosure, based on the above solutions, the point cloud file includes a seventh field, which is used for indicating the number of point cloud viewports associated with auxiliary information.

In some embodiments of the present disclosure, based on the above solutions, the point cloud file includes an eighth field, which is used for indicating an identifier of the point cloud viewport associated with the auxiliary information. The identifier is used for uniquely identifying the point cloud viewport.

In some embodiments of the present disclosure, based on the above solutions, the processing unit 506 is configured to: acquire description content to be displayed in the point cloud viewport according to values of the fields included in the auxiliary information, and determine a presentation position of the description content; and display the description content at the presentation position in the point cloud viewport.

Figure 6:
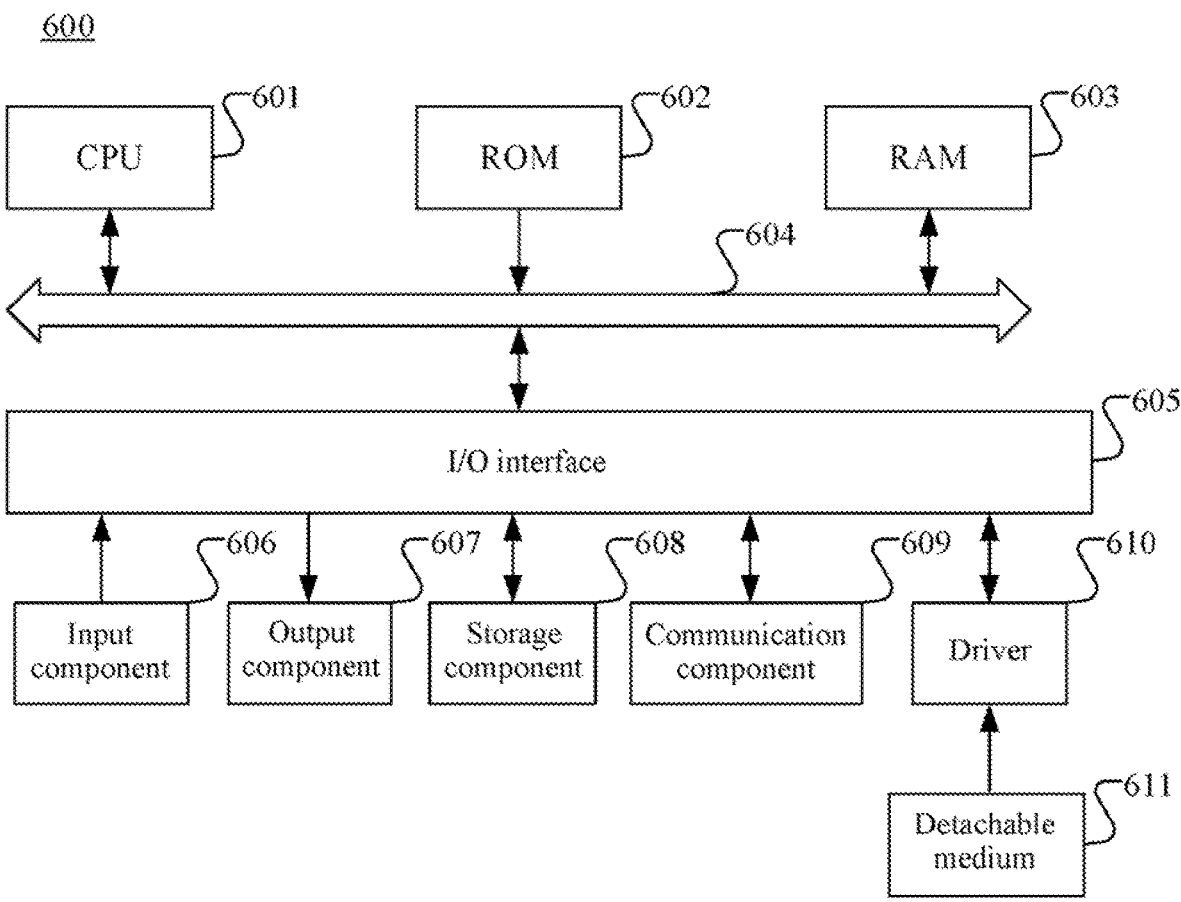
FIG. 6 is a schematic structural diagram of a computer system of an electronic device according to certain embodiment(s) of the present disclosure.

FIG. 6 shows a schematic structural diagram of a computer system of an electronic device suitable for implementation of the embodiments of the present disclosure.

The computer system 600 of the electronic device shown in FIG. 6 is merely an example, and does not constitute any limitation on functions and use ranges of the embodiments of the present disclosure.

As shown in FIG. 6, the computer system 600 includes a central processing unit (CPU) 601, which may perform various suitable actions and processing based on a program stored in a read-only memory (ROM) 602 or a program loaded from a storage part 608 into a random access memory (RAM) 603, for example, perform the method described in the embodiments. The RAM 603 further stores various programs and data desired for system operations. The CPU 601, the ROM 602, and the RAM 603 are connected to each other by using a bus 604. An input/output (I/O) interface 605 is also connected to the bus 604.

The following components are connected to the I/O interface 605: an input part 606 including a keyboard, a mouse, and the like; an output part 607 including a cathode ray tube (CRT), a liquid crystal display (LCD), a speaker, and the like; a storage part 908 including a hard disk and the like; and a communication part 609 including a network interface card such as a local area network (LAN) card, a modem, and the like. The communication part 609 performs communication processing by using a network such as the Internet. A driver 610 is also connected to the I/O interface 605 as desired. A removable medium 611, such as a magnetic disk, an optical disc, a magneto-optical disk, or a semiconductor memory, is mounted on the driver 610 as desired, so that a computer program read from the removable medium is installed into the storage part 608 as desired.

Particularly, according to an embodiment of the present disclosure, the processes described above by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed from the network through the communication portion 609, and/or installed from the removable medium 611. When the computer program is executed by the CPU 601, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, apparatus, or device. In the present disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may transmit, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of the present disclosure may be implemented in a software manner, or may be implemented in a hardware manner, and the unit described can also be set in a processor. Names of the units do not constitute a limitation on the units in an implementation.

According to another aspect, the present disclosure further provides a computer-readable medium. The computer-readable medium may be included in the electronic device described in the embodiments, or may exist alone and is not disposed in the electronic device. The computer-readable medium carries one or more programs, the one or more programs, when executed by the electronic device, causing the electronic device to implement the method described in the embodiments.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

According to the descriptions of the implementations, a person skilled in the art may readily understand that the exemplary implementations described herein may be implemented by using software, or may be implemented by combining software and suitable hardware. Therefore, the technical solutions of the implementations of the present disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of the present disclosure.

After considering the present disclosure and practicing the disclosed implementations, a person skilled in the art may easily conceive of other implementations of the present disclosure. The present disclosure is intended to cover any variations, uses, or adaptive changes of the present disclosure following the general principles of the present disclosure, and includes knowledge and technical means undisclosed in the present disclosure.

What is claimed is:

1. A method for presenting a point cloud viewport, implemented by an electronic device, the method comprising:
   acquiring a point cloud file, the point cloud file including information of a point cloud viewport and auxiliary information associated with the point cloud viewport, the auxiliary information corresponding to a type of the point cloud viewport;
   parsing the point cloud file to obtain the information of the point cloud viewport and the auxiliary information; and
   presenting the point cloud viewport according to the information of the point cloud viewport, and presenting corresponding description content in the point cloud viewport according to the auxiliary information,
   wherein the auxiliary information includes a type filed indicating a type of the auxiliary information associated with the point cloud viewport, and values of the type field correspond to a plurality of types of the auxiliary information, the plurality of types include a subtitle type indicated by a first value of the type field, a marker type indicated by a second value of the type field, and an annotation type indicated by a third value of the type field.

2. The method according to claim 1, wherein the point cloud file includes a first field, and a value of the first field is used for indicating the number of the auxiliary information associated with the point cloud viewport.

3. The method according to claim 1, wherein the auxiliary information includes a third field, the third field is used for indicating an identifier of the auxiliary information, and the identifier is used for uniquely identifying the auxiliary information.

4. The method according to claim 1, wherein the auxiliary information includes a fourth field, and the fourth field is used for indicating the description content of the auxiliary information.

5. The method according to claim 1, wherein the auxiliary information includes a fifth field, and the fifth field is used for indicating that the auxiliary information is associated with the whole area of the point cloud viewport when a value of the fifth field is a first value, and for indicating that the auxiliary information is associated with a partial area of the point cloud viewport when a value of the fifth field is a second value.

6. The method according to claim 1, wherein the auxiliary information includes a sixth field, the sixth field is used for indicating a distance between a planar area associated with the auxiliary information and the central position in the point cloud viewport, and the planar area is used for displaying the description content of the auxiliary information.

7. The method according to claim 6, wherein attribute information of the planar area is matched with attribute information of the point cloud viewport, and the attribute information includes at least one of position information, rotation information, and plane type information.

8. The method according to claim 1, wherein the point cloud file includes a seventh field, and the seventh field is used for indicating the number of point cloud viewports associated with auxiliary information.

9. The method according to claim 1, wherein the point cloud file includes an eighth field, the eighth field is used for indicating an identifier of the point cloud viewport associated with the auxiliary information, and the identifier is used for uniquely identifying the point cloud viewport.

10. The method according to claim 1, wherein presenting corresponding description content comprises:
acquiring description content to be displayed in the point cloud viewport according to values of the fields comprised in the auxiliary information, and determining a presentation position of the description content; and
displaying the description content at the presentation position in the point cloud viewport.

11. The method according to claim 1, wherein:
the point cloud file having the auxiliary information of the subtitle type is corresponded to a film.

12. The method according to claim 1, wherein:
the point cloud file having the auxiliary information of the marker type is corresponded to a map.

13. The method according to claim 1, wherein:
the point cloud file having the auxiliary information of the annotation type is corresponded to a video communication.

14. An apparatus for presenting a point cloud viewport, comprising: a memory storing computer program instructions; and a processor coupled to the memory and configured to execute the computer program instructions and perform:
acquiring a point cloud file, the point cloud file including information of a point cloud viewport and auxiliary information associated with the point cloud viewport, the auxiliary information corresponding to a type of the point cloud viewport;
parsing the point cloud file to obtain the information of the point cloud viewport and the auxiliary information; and
presenting the point cloud viewport according to the information of the point cloud viewport, and presenting corresponding description content in the point cloud viewport according to the auxiliary information,
wherein the auxiliary information includes a type filed indicating a type of the auxiliary information associated with the point cloud viewport, and values of the type field correspond to a plurality of types of the auxiliary information, the plurality of types include a subtitle type indicated by a first value of the type field, a marker type indicated by a second value of the type field, and an annotation type indicated by a third value of the type field.

15. The apparatus according to claim 14, wherein the point cloud file includes a first field, and a value of the first field is used for indicating the number of the auxiliary information associated with the point cloud viewport.

16. The apparatus according to claim 14, wherein the auxiliary information includes a third field, the third field is used for indicating an identifier of the auxiliary information, and the identifier is used for uniquely identifying the auxiliary information.

17. The apparatus according to claim 14, wherein the auxiliary information includes a fourth field, and the fourth field is used for indicating the description content of the auxiliary information.

18. The apparatus according to claim 14, wherein the auxiliary information includes a fifth field, and the fifth field is used for indicating that the auxiliary information is associated with the whole area of the point cloud viewport when a value of the fifth field is a first value, and for indicating that the auxiliary information is associated with a partial area of the point cloud viewport when a value of the fifth field is a second value.

19. A non-transitory computer-readable storage medium storing computer program instructions executable by at least one processor to perform:
acquiring a point cloud file, the point cloud file including information of a point cloud viewport and auxiliary information associated with the point cloud viewport, the auxiliary information corresponding to a type of the point cloud viewport;
parsing the point cloud file to obtain the information of the point cloud viewport and the auxiliary information; and
presenting the point cloud viewport according to the information of the point cloud viewport, and presenting corresponding description content in the point cloud viewport according to the auxiliary information,
wherein the auxiliary information includes a type filed indicating a type of the auxiliary information associated with the point cloud viewport, and values of the type field correspond to a plurality of types of the auxiliary information, the plurality of types include a subtitle type indicated by a first value of the type field, a marker type indicated by a second value of the type field, and an annotation type indicated by a third value of the type field.

* * * * *